(12) United States Patent
Ohba et al.

(10) Patent No.: US 7,290,519 B2
(45) Date of Patent: Nov. 6, 2007

(54) AIR INTAKE APPARATUS

(75) Inventors: Tohru Ohba, Toyota (JP); Akira Suzuki, Toyota (JP); Atsushi Hirota, Kuwana (JP); Kazuhiro Hayashi, Nishikamo-gun (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 0 days.

(21) Appl. No.: 11/485,315

(22) Filed: Jul. 13, 2006

(65) Prior Publication Data

US 2007/0012282 A1 Jan. 18, 2007

(30) Foreign Application Priority Data

Jul. 14, 2005 (JP) .............................. 2005-205953

(51) Int. Cl.
*F02M 35/02* (2006.01)
*F02M 35/10* (2006.01)

(52) U.S. Cl. ............................. 123/198 E; 123/184.21; 123/184.43; 123/184.48; 123/184.25

(58) Field of Classification Search ........... 123/184.42, 123/184.43, 184.44, 184.47, 184.48, 184.49, 123/184.35, 184.25, 198 E, 184.21; 55/385.3
See application file for complete search history.

(56) References Cited

U.S. PATENT DOCUMENTS 4,548,166 A * 10/1985 Gest ....................... 123/198 E
5,000,130 A * 3/1991 Yamada ................... 123/184.43
6,287,355 B1 * 9/2001 Park ............................. 55/419
6,409,783 B1 * 6/2002 Miyajima et al. .......... 55/385.3
6,966,298 B2 * 11/2005 Tsugami et al. ............ 123/399
2004/0093839 A1 * 5/2004 Storz ......................... 55/385.3

FOREIGN PATENT DOCUMENTS

JP        58-84362        6/1983

* cited by examiner

*Primary Examiner*—Stephen K. Cronin
*Assistant Examiner*—Ka Chun Leung
(74) *Attorney, Agent, or Firm*—Oblon, Spivak, McClelland, Maier & Neustadt, P.C.

(57) ABSTRACT

An air intake apparatus configured to combine air filtered separately through a plurality of air cleaners and lead it to a single throttle body suppresses or prevents variation in the pressure of airflow introduced from a plurality of intake paths to the single throttle body. Outside air is introduced to the plurality of air cleaners by a single air cleaner inlet. The air cleaner inlet has a chamber of a predetermined capacity which has a single intake duct, and a plurality of branching passages which branch off from the chamber into the same number as there are air cleaners and are connected to the separate air cleaners.

16 Claims, 3 Drawing Sheets

AIR INTAKE APPARATUS

INCORPORATION BY REFERENCE

The disclosure of Japanese Patent Application No. 2005-205953 filed on Jul. 14, 2005, including the specification, drawings and abstract is incorporated herein by reference in its entirety.

BACKGROUND OF THE INVENTION

1. Field of the Invention

The invention relates to an air intake apparatus mounted to an internal combustion engine. More particularly, the invention relates to an air intake apparatus configured to combine air that has been filtered separately by a plurality of air cleaners and lead that air to a single intake throttle valve.

2. Description of the Related Art

An air intake apparatus is typically mounted to a cylinder head of an internal combustion engine mounted in a vehicle, for example, via an intake manifold.

One such air intake apparatus which is disclosed in Japanese Utility Model Publication No. 58-84362U, for example, is a twin air intake apparatus configured such that air which has been drawn in separately from, for example, two air cleaner inlets and filtered separately by two air cleaners is led to a throttle body which serves as a single intake throttle valve. In this case, the intake ducts for the two air cleaners are arranged apart from one another in the vehicle width direction.

Because the intake ducts for the two air cleaners are arranged separated from one another in the vehicle width direction, however, wind produced as the vehicle runs is not always drawn in evenly to the two intake ducts with this related air intake apparatus.

As a result, the pressures of the airflows introduced into the throttle body separately from the two air cleaners tends to vary depending on the running state of the vehicle. Moreover, a phenomenon may occur in which the outputs of each of the two airflow meters separately arranged from the two air cleaners to the single intake throttle valve fluctuate or vary due to a disturbance in airflow which has no place to go when the intake throttle valve is temporarily closed.

Such variation in the outputs of the airflow meters leads to reduced accuracy in air-fuel ratio control that uses the output of the airflow meter, so there still remains room for improvement.

SUMMARY OF THE INVENTION

In view of the foregoing problems, this invention thus provides an air intake apparatus in which downstream ends of a plurality of intake paths are joined together and connected to a single intake throttle valve, which is capable of suppressing or preventing variation in the pressure of airflow introduced from the plurality of intake paths to the single intake throttle valve.

A first aspect of the invention relates to an air intake apparatus. This air intake apparatus is comprised of a plurality of air cleaners, a joining passage which is connected to downstream ends of intake paths of the plurality of air cleaners and combines air from the plurality of air cleaners and leads the air to a single intake throttle valve, and a single air cleaner inlet that has i) a chamber which is connected to upstream ends of the intake paths of the plurality of air cleaners, has a predetermined capacity, and is provided with a single intake duct, and ii) a plurality of flow passages which branch off from the chamber into the same number as there are the plurality of air cleaners, each of the flow passages being connected to the separate air cleaner.

According to this structure, regardless of the running state of the vehicle, the wind produced as the vehicle runs enters from a single intake duct, i.e., from a single location, so the air that is drawn in from this intake duct and flows into the chamber can be divided equally into the flow passages.

As a result, air can be led into the plurality of air cleaners evenly from the plurality of intake paths so the pressure of the airflow introduced from the plurality of air cleaners to the single intake throttle valve is substantially even. As a result, airflow that has no where to go when the intake throttle valve is temporarily closed does not easily become disturbed.

Further, when there is only one intake duct, the passages to the two air cleaners must be curved, which may increase the pressure loss. However, because the air pressure is attenuated in the chamber immediately after the air flows into the intake duct, this kind of pressure loss is able to be suppressed.

The lengths of the plurality of intake paths from the single intake duct to the intake throttle valve may be made substantially equal, and the diameters of the plurality of intake paths from the single intake duct to the intake throttle valve may also be made substantially equal.

Moreover, the plurality of intake paths from the single intake duct to the intake throttle valve may be structured such that the intake resistance of all of those intake paths is substantially equal.

This structure specifies the requirements necessary to suppress or prevent a fluctuation in pressure of air flowing into the plurality of air cleaners.

Two of the air cleaners are arranged in the vehicle width direction as the plurality of air cleaner, there may be two of the intake paths from the chamber to the intake throttle valve, i.e., a first intake path and a second intake path. The single intake duct and the single intake throttle valve may be arranged one in back of the other on a horizontal plane, and the first intake path and the second intake path may be arranged axisymmetrically on the horizontal plane with respect to a straight line that connects the center of the intake duct with the center of the intake throttle valve.

The joining passage is formed of a W-shaped tubular body and includes a first upstream passage and a second upstream passage, an upstream end of the first upstream passage being connected to an outlet of one of the two air cleaners and an upstream end of the second upstream passage being connected to an outlet of the other of the two air cleaners, a downstream portion, a downstream end of which is connected to a member having the intake throttle valve, and a joining portion which joins a downstream end of the first upstream passage, with a downstream end of the second upstream passage and which is connected to an upstream end of the downstream passage.

A detector that detects an airflow rate is mounted to the first upstream passage and the second upstream passage.

According to this structure, two intake paths are arranged distributed in a balanced manner on a horizontal plane which is advantageous for obtaining equal lengths, equal diameters, and equal air resistance of the two intake paths, and also improves installability in the vehicle. Further, variation in the outputs of the two detecting means provided downstream of the two air cleaners is less apt to occur.

The air intake apparatus according to this aspect of the invention makes it possible to suppress or prevent pressure variation in the airflow that is introduced from the plurality of intake paths to the single intake throttle valve.

As a result, variation in the output of airflow detecting means such as an airflow meter arranged in each of the intake paths can be reduced, which is advantageous for improving operating stability as it can contribute to improved accuracy of air-fuel ratio control of the internal combustion engine and the like.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, example embodiments of the invention will be described with reference to FIGS. 1 to 4. The air intake apparatus exemplified in the following example embodiment is one which is used with a V-type internal combustion engine.

Figure 1:
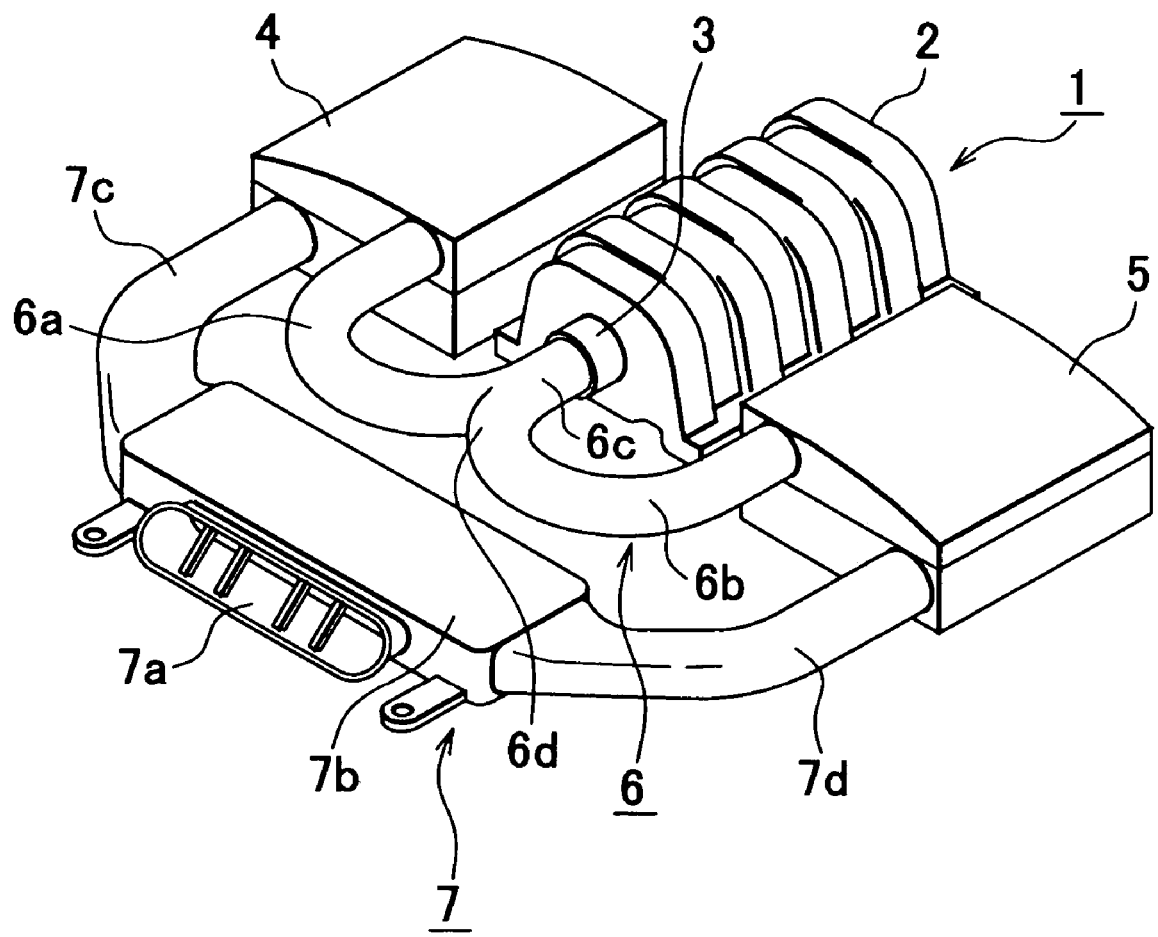
FIG. 1 is a perspective view of an air intake apparatus according to an example embodiment of the invention.
Figure 2:
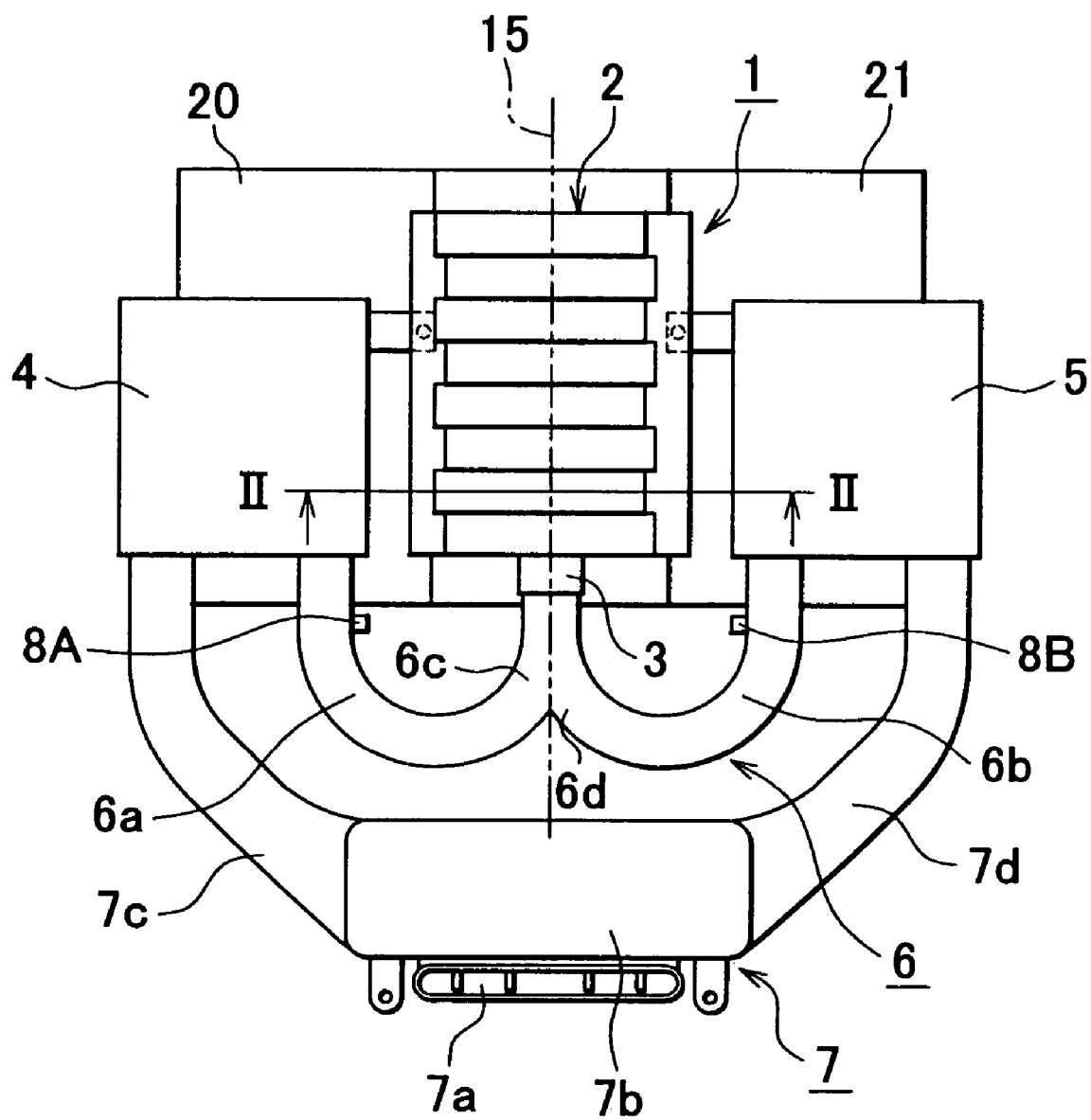
FIG. 2 is a plan view of the air intake apparatus shown in FIG. 1.

An air intake apparatus 1 shown in FIGS. 1 and 2 has twin intake paths and includes an intake manifold 2 having a surge tank (hereinafter simply referred to as "intake manifold 2"), a single throttle body 3 which is one example of an intake throttle valve, two air cleaners 4 and 5, a single air cleaner hose 6, and a single air cleaner inlet 7.

The intake manifold 2 is mounted to upper portions of two cylinder heads 20 and 21 provided on a V-type internal combustion engine.

Figure 3:
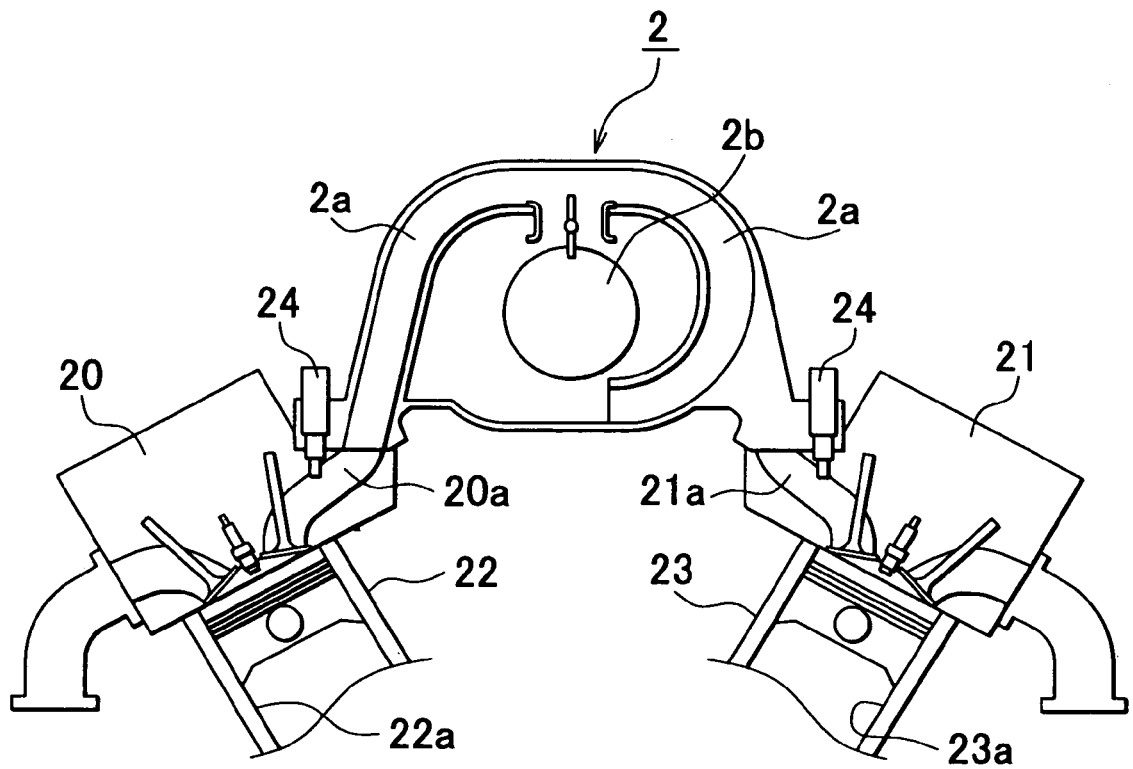
FIG. 3 is an arrow view of a cross-section taken along line II-II in FIG. 2.
Figure 4:
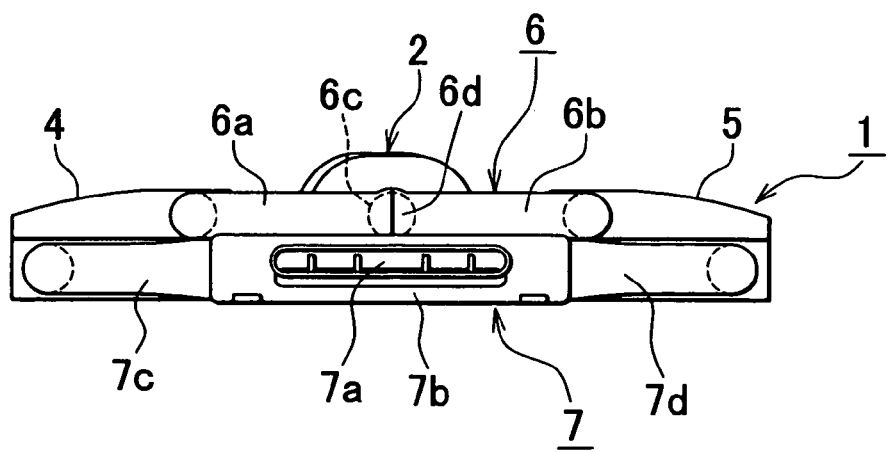
FIG. 4 is a front view of the air intake apparatus shown in FIG. 1.

As shown in FIG. 3, this intake manifold 2 is structured having the same number of intake passages 2a as there are cylinder bores 22a and 23a in two banks 22 and 23 of a cylinder block (not numbered in the drawing) provided in parallel, and a surge tank 2b housed inside. The surge tank 2b is arranged between the upstream side of the intake passages 2a and the mounting portion side of a throttle body 3. The downstream ends of the intake passages 2a are connected to intake ports 20a and 21a corresponding to the cylinder heads 20 and 21, forming intake paths.

The throttle body 3 is mounted to an air-fuel mixture inlet of the intake manifold 2.

Although the structure of this throttle body 3 is not shown in detail in the drawing, it is configured to control the outside intake air quantity by adjusting the opening amount of a passage formed inside using a throttle valve which is driven by an actuator or the like.

The first and second air cleaners 4 and 5 are mounted to the throttle body 3 via an air cleaner hose 6.

Although the structures of these first and second air cleaners 4 and 5 are not shown in detail in the drawing, they each house an air cleaner element in a hollow resin case, for example, with which they remove foreign matter in the outside air that is introduced from the air cleaner inlet 7.

The air cleaner hose 6 is formed of a tubular body that is generally W-shaped when viewed from above. This air cleaner hose 6 includes first and second upstream passages 6a and 6b, a down stream passage 6c, and a joining portion 6d. The first and second upstream passages 6a and 6b are each separately communicatively connected at one end (i.e., the upstream end) to outlets of the first and second air cleaners 4 and 5. The downstream passage 6c is communicatively connected to the single throttle body 3. The joining portion 6d is a portion that joins the other ends (i.e., the downstream ends) of the first and second upstream passages 6a and 6b together and is connected to the downstream passage 6c.

Airflow meters 8A and 8B for detecting an airflow rate are mounted to the insides of the first and second upstream passages 6a and 6b of the air cleaner hose 6.

The air cleaner inlet 7 serves to draw in outside air and introduce it into the first and second air cleaners 4 and 5. This air cleaner inlet 7 includes a chamber 7b of a predetermined capacity which has a single intake duct 7a, and a plurality of branching passages 7c and 7d, one corresponding to each one of the air cleaners 4 and 5, which branch off from this chamber 7b and connect separately to the first and second air cleaners 4 and 5.

The air cleaner inlet 7 in this example embodiment is a generally U-shaped tubular body with the chamber 7b, which is generally rectangular, being disposed in the center portion. The intake duct 7a, which is also generally rectangular, is provided on the front end surface of this chamber 7b. A tubular body which extends in one direction from the chamber 7b serves as the first branching passage 7c and a tubular body which extends in the other direction from the chamber 7b serves as the second branching passage 7d.

The chamber 7b attenuates the pressure of the air flowing in from the intake duct 7a, and is designed to have a suitable amount of space taking into account the length and bore diameter and the like of the air cleaner inlet 7 to ensure proper function.

The following effects can be obtained as long as sufficient space is ensured in the chamber 7b in this way. When there is only one intake duct 7a, the passages (i.e., the branching passages 7c and 7d) to the two air cleaners 4 and 5 must be curved, which may cause pressure loss of the air. Because the air pressure is attenuated such that the airflow is divided with little resistance inside the chamber 7b immediately after air flows into the intake duct 7a, however, that pressure loss is able to be suppressed. Moreover, providing the chamber 7b enables the single intake duct 7a to be made comparatively small which is advantageous for reducing both intake noise and the inflow of foreign matter such as water and snow.

The air intake apparatus 1 according to this example embodiment having this kind of structure is mounted to a vehicle by attaching and fixing the throttle body 3 to the intake manifold 2 and supporting the first and second air cleaners 4 and 5 and the air cleaner inlet 7 by the vehicle body or the internal combustion engine or the like, not shown.

As shown in the drawing, the two intake paths of the air intake apparatus 1 according to this example embodiment are symmetrical.

The foregoing structure will now be described. First, the specifications of the first and second air cleaners 4 and 5 are the same. The air cleaner hose 6 is also structured such that the first and second upstream passages 6a and 6b are axisymmetrical structures on a horizontal plane with respect to a center axis of the downstream passage 6c.

Also, the two intake paths include a first intake path and a second intake path. The first intake path is made up of the first branching passage 7c of the air cleaner inlet 7 and the first upstream passage 6a of the air cleaner hose 6, while the second intake path is made up of the second branching passage 7d of the air cleaner inlet 7 and the second upstream passage 6b of the air cleaner hose 6. These first and second intake paths are arranged axisymmetrical on a horizontal plane with respect to a straight line (denoted by reference numeral 15 in FIG. 2) which connects the center of the joining portion 6d of the air cleaner hose 6, the center of the intake duct 7a of the air cleaner inlet 7, and the center of the throttle body 3.

When two intake paths are provided in this way, the pressures of the air flowing into the first and second air cleaners 4 and 5 may be made substantially equal by making the lengths and the diameters and the like of the first and second intake paths from the single intake duct 7a to the throttle body 3 substantially equal, respectively.

Next, the outside air intake operation in the air intake apparatus 1 will be described.

Outside air is first drawn into the single intake duct 7a of the air cleaner inlet 7 and enters the chamber 7b. From the chamber 7b, some of the air flows through the first branching passage 7c of the air cleaner inlet 7 and is filtered by the first air cleaner 4, and some of it flows through the second branching passage 7d of the air cleaner inlet 7 and is filtered by the second air cleaner 5. Air that has flowed through the first and second air cleaners 4 and 5 is then fed through the air hose 6 where it is recombined and delivered via the throttle body 3 to the intake manifold 2. From the intake manifold 2, the air is then supplied to the intake ports 20a and 21a of the cylinder head 20 and 21.

Fuel is also injected into the intake ports 20a and 21a from a fuel injection device 24 such as a fuel injector. The supplied intake air and the injected fuel mix together to form an air-fuel mixture which is then supplied into the combustion chambers in both banks 22 and 23 of the cylinder block.

As described above, in this example embodiment, a single intake duct 7a is provided to which the upstream ends of the plurality of branching passages 7c and 7d are joined. Therefore, regardless of the running state of the vehicle, wind produced as a vehicle provided with the air intake apparatus 1 runs flows only into the single intake duct 7a, i.e., flows in from only a single location in the vehicle width direction. As a result, the air drawn in from this intake duct 7a and introduced into the chamber 7b is divided substantially evenly into the branching passages 7c and 7d.

Accordingly, air can be introduced to the first and second air cleaners 4 and 5 substantially evenly which enables it to reach the single throttle body 3 with the airflow pressure having been efficiently reduced to suppress or prevent fluctuations in the airflow pressure. As a result, airflow that has no where to go when the throttle body 3 is temporarily closed does not become disturbed as easily so variation in the outputs of the two airflow meters 8A and 8B provided downstream of the first and second air cleaners 4 and 5 is less apt to occur. Reducing the tendency for variation to occur in the outputs of the airflow meters 8A and 8B in this way is advantageous for improving operating stability as it can contribute to improved accuracy of air-fuel ratio control of the internal combustion engine and the like.

In particular, it could be said that the operation and effects described above can be sufficiently exhibited because the two intake paths of the air intake apparatus 1 of this example embodiment are symmetrical.

The foregoing exemplary embodiments may also be implemented with the following modifications.

(1) The foregoing example embodiment described the intake apparatus 1 as having two intake paths. The invention is not limited to this, however. That is, the invention can also be applied to an air intake apparatus having more than two intake paths.

(2) In the foregoing example embodiment, the air intake apparatus 1 is used with a V-type internal combustion engine. Alternatively, for example, the air intake apparatus 1 can be applied to a horizontally opposed internal combustion engine or other type of internal combustion engine.

(3) In the foregoing example embodiment, the two intake paths of the air intake apparatus 1 are symmetrical. The invention is not limited to this however. For example, the invention can also be applied to an air intake apparatus in which the two intake paths are asymmetrical.

In this case, the length, bore diameter, intake air resistance, and the like of each intake path may be set appropriately to make the airflow from the plurality of intake paths to the throttle body 3 substantially even.

(4) Although not shown in the drawings, the foregoing air intake apparatus 1 may also be provided as appropriate with a resonance type silencer, such as a resonator or a side branch, for example, downstream of the first and second air cleaners 4 and 5.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An air intake apparatus comprising:
   a plurality of air cleaners;
   a joining passage which is connected to downstream ends of intake paths of the plurality of air cleaners and combines air from the plurality of air cleaners and leads the air to a single intake throttle valve; and
   a single air cleaner inlet that has i) a chamber which is connected to upstream ends of the intake paths of the plurality of air cleaners, has a predetermined capacity, and is provided with a single intake duct, and ii) a plurality of flow passages which branch off from the chamber into the same number as there are the plurality of air cleaners, each of the flow passages being connected to the separate air cleaner,
   wherein the chamber includes a portion having a larger cross-sectional area than the flow passages.

2. The air intake apparatus according to claim 1, wherein the plurality of intake paths from the single intake duct to the intake throttle valve have substantially equal lengths and substantially equal diameters.

3. The air intake apparatus according to claim 1, wherein the plurality of intake paths from the single intake duct to the intake throttle valve have substantially equal intake resistance.

4. The air intake apparatus according to claim 1, wherein two of the air cleaners are arranged in the vehicle width direction as the plurality of air cleaner, the intake paths from the chamber to the intake throttle valve include a first intake path and a second intake path, the single intake duct and the single intake throttle valve are arranged one in back of the other on a horizontal plane, and the first intake path and the second intake path are arranged axisymmetrically on the horizontal plane with respect to a straight line that connects the center of the intake duct with the center of the intake throttle valve.

5. The air intake apparatus according to claim 1, wherein said chamber is substantially rectangular.

6. The air intake apparatus according to claim 1, wherein each of said plurality of air cleaners separately house at least one cleaning element in a hollow case.

7. The air intake apparatus according to claim 1, wherein the joining passage is formed of a tubular body that includes a first upstream passage and a second upstream passage, an upstream end of the first upstream passage being connected to a first outlet of one of the plurality of air cleaners and an upstream end of the second upstream passage being separately connected to a second outlet of another one of the plurality of air cleaners.

8. The air intake apparatus according to claim 1, wherein at least one of the plurality of air cleaners includes a housing separate from another one of the plurality of air cleaners.

9. The air intake apparatus according to claim 1, wherein the chamber attenuates the pressure of the air flowing in from the single intake duct.

10. The air intake apparatus according to claim 1, wherein the single intake duct has a duct cross-sectional area substantially perpendicular to a direction of flow of the air into the single intake duct, wherein the chamber has a chamber cross-sectional area substantially perpendicular to the direction of flow of the air into the single intake duct, and wherein the chamber cross-sectional area is greater than the duct cross-sectional area.

11. The air intake apparatus according to claim 1, wherein the single intake duct has a duct cross-sectional area substantially perpendicular to a direction the single intake duct extends from an inlet portion of the single intake duct to the chamber, wherein the chamber has a chamber cross-sectional area substantially parallel to the duct cross-sectional area, and wherein the chamber cross-sectional area is greater than the duct cross-sectional area.

12. The air intake apparatus according to claim 1, wherein each of the plurality of flow passages has a flow passage cross-sectional area substantially perpendicular to a direction that a respective flow passage extends from the chamber to a respective one of the plurality of air cleaners, and wherein the chamber has a chamber cross-sectional area greater than the flow passage cross-sectional area.

13. The air intake apparatus according to claim 1, wherein each of the plurality of flow passages has a flow passage cross-sectional area substantially perpendicular to a direction that a respective flow passage extends from the chamber to a respective one of the plurality of air cleaners, wherein the chamber has a chamber cross-sectional area substantially perpendicular to an inlet of the respective flow passage, and wherein the chamber cross-sectional area is greater than the flow passage cross-sectional area.

14. The air intake apparatus according to claim 1, wherein the single intake duct has a duct cross-sectional area substantially perpendicular to a direction of flow of the air into the single intake duct, wherein the chamber has a first chamber cross-sectional area substantially perpendicular to the direction of flow of the air into the single intake duct, wherein the first chamber cross-sectional area is greater than the duct cross-sectional area, wherein each of the plurality of flow passages has a flow passage cross-sectional area substantially perpendicular to a direction that a respective flow passage extends from the chamber to a respective one of the plurality of air cleaners, wherein the chamber has a second chamber cross-sectional area substantially perpendicular to an inlet of the respective flow passage, and wherein the second chamber cross-sectional area is greater than the flow passage cross-sectional area.

15. An air intake apparatus comprising:

a plurality of air cleaners;

a joining passage which is connected to downstream ends of intake paths of the plurality of air cleaners and combines air from the plurality of air cleaners and leads the air to a single intake throttle valve; and a single air cleaner inlet that has i) a chamber which is connected to upstream ends of the intake paths of the plurality of air cleaners, has a predetermined capacity, and is provided with a single intake duct, and ii) a plurality of flow passages which branch off from the chamber into the same number as there are the plurality of air cleaners, each of the flow passages being connected to the separate air cleaner, wherein two of the air cleaners are arranged in the vehicle width direction as the plurality of air cleaner, the intake paths from the chamber to the intake throttle valve include a first intake path and a second intake path, the single intake duct and the single intake throttle valve are arranged one in back of the other on a horizontal plane, and the first intake path and the second intake path are arranged axisymmetrically on the horizontal plane with respect to a straight line that connects the center of the intake duct with the center of the intake throttle valve, and wherein the joining passage is formed of a W-shaped tubular body and includes a first upstream passage and a second upstream passage, an upstream end of the first upstream passage being connected to an outlet of one of the two air cleaners and an upstream end of the second upstream passage being connected to an outlet of the other of the two air cleaners, a downstream portion, a downstream end of which is connected to a member having the intake throttle valve, and a joining portion which joins a downstream end of the first upstream passage with a downstream end of the second upstream passage and which is connected to an upstream end of the downstream passage.

16. The air intake apparatus according to claim 15, wherein a detector that detects an airflow rate is mounted to the first upstream passage and the second upstream. passage.

* * * * *